(12) United States Patent
Armangau et al.

(10) Patent No.: US 8,909,887 B1
(45) Date of Patent: Dec. 9, 2014

(54) SELECTIVE DEFRAGMENTATION BASED ON IO HOT SPOTS

(71) Applicant: EMC Corporation, Hopkinton, MA (US)

(72) Inventors: Philippe Armangau, Acton, MA (US); Chris Seibel, Walpole, MA (US); Xiangping Chen, Sherborn, MA (US); Jean-Pierre Bono, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 140 days.

(21) Appl. No.: 13/626,422

(22) Filed: Sep. 25, 2012

(51) Int. Cl.
| | |
|---|---|
| G06F 12/00 | (2006.01) |
| G06F 13/00 | (2006.01) |
| G06F 13/28 | (2006.01) |
| G06F 7/00 | (2006.01) |
| G06F 17/00 | (2006.01) |

(52) U.S. Cl.
USPC .......................................... 711/165; 707/693

(58) Field of Classification Search
USPC .......................................... 711/165; 707/693
See application file for complete search history.

(56) References Cited

U.S. PATENT DOCUMENTS

| | | | |
|---|---|---|---|
| 6,571,259 B1 | 5/2003 | Zheng et al. |
| 7,631,155 B1 | 12/2009 | Bono et al. |
| 7,694,191 B1 | 4/2010 | Bono et al. |
| 7,752,312 B1 | 7/2010 | Perrin et al. |
| 7,783,682 B1 | 8/2010 | Patterson |
| 7,818,535 B1 | 10/2010 | Bono et al. |
| 7,870,356 B1 | 1/2011 | Veeraswamy et al. |
| 8,037,345 B1 | 10/2011 | Iyer et al. |
| 8,046,366 B1 | 10/2011 | Perrin et al. |
| 8,140,821 B1 | 3/2012 | Raizen et al. |
| 8,156,306 B1 | 4/2012 | Raizen et al. |
| 8,195,614 B2 | 6/2012 | Patterson |
| 8,285,758 B1 | 10/2012 | Bono et al. |
| 8,332,612 B1 | 12/2012 | Raizen et al. |
| 8,380,928 B1 | 2/2013 | Chen et al. |
| 8,381,213 B1 | 2/2013 | Naamad et al. |
| 8,392,370 B1 | 3/2013 | Whitney et al. |
| 8,407,265 B1 | 3/2013 | Scheer et al. |
| 8,429,346 B1 | 4/2013 | Chen et al. |
| 8,442,952 B1 | 5/2013 | Armangau et al. |
| 8,538,933 B1 | 9/2013 | Hu et al. |

(Continued)

OTHER PUBLICATIONS

Rieman et al., Performance Analysis of Concurrent-Read Exclusive-Write, 1991, ACM, 10 pages.*

*Primary Examiner* — April Y Blair
*Assistant Examiner* — Gary W Cygiel
(74) *Attorney, Agent, or Firm* — BainwoodHuang

(57) ABSTRACT

A technique of managing data fragmentation is performed in a data storage apparatus. The technique involves receiving an indication that IO access to particular data stored within a memory space has exceeded a predefined threshold level. The technique further involves performing, in response to the indication, a defragmentation evaluation operation. The technique further involves performing a set of data movement operations which moves the particular data from a first set of storage locations of the memory space to a second set of storage locations of the memory space to improve defragmentation of the particular data when a result of the defragmentation evaluation operation has a first value. The technique further involves maintaining the particular data at the first set of storage locations of the memory space when the result of the defragmentation evaluation operation has a second value which is different than the first value.

21 Claims, 10 Drawing Sheets

(56) References Cited

U.S. PATENT DOCUMENTS

| | | |
|---|---|---|
| 8,539,148 B1 | 9/2013 | Chen et al. |
| 8,543,615 B1 | 9/2013 | Nair et al. |
| 8,566,371 B1 | 10/2013 | Bono et al. |
| 8,566,483 B1 | 10/2013 | Chen et al. |
| 2003/0061546 A1* | 3/2003 | Collins et al. ............... 714/42 |
| 2007/0050429 A1 | 3/2007 | Goldring et al. |
| 2008/0077682 A1 | 3/2008 | Nair et al. |
| 2009/0265399 A1 | 10/2009 | Cannon et al. |
| 2011/0197046 A1* | 8/2011 | Chiu et al. ............... 711/171 |
| 2013/0166862 A1 | 6/2013 | Huang |

\* cited by examiner

| | LOCK TYPE 250 | LU ID/FILE ID 252 | TIME STAMP 254 | RANGE FIELDS 256 | |
|---|---|---|---|---|---|
| | | | | STARTING OFFSET 258 | RANGE LENGTH 260 |
| 240(1) ▶ | READ | 1015 | 15:38:42 | 8 | 128 |
| 240(2) ▶ | WRITE | 1017 | 15:38:45 | 26 | 27 |
| 240(3) ▶ | READ | 1002 | 15:39:01 | 238 | 113 |
| 240(4) ▶ | READ | 1002 | 15:39:02 | 215 | 88 |
| 240(5) ▶ | WRITE | 1017 | 15:42:32 | 28 | 10 |
| 240(6) ▶ | WRITE | 998 | 15:44:01 | 30 | 16 |
| 240(7) ▶ | READ | 998 | 16:08:23 | 32 | 45 |
| 240(8) ▶ | READ | 1028 | 18:21:32 | 18 | 26 |
| | ... | ... | ... | ... | ... |

FIG. 8

SELECTIVE DEFRAGMENTATION BASED ON IO HOT SPOTS

BACKGROUND

In general, fragmentation occurs when a computer stores a file across non-contiguous areas of memory. For example, suppose that a file initially resides in a single contiguous area of memory. Over time, the computer may store new blocks of the file in other areas which are not contiguous with that area (e.g., as the file grows in size, as the information within the file is modified and is stored as a new version, etc.). Such scattering of the blocks to separate areas of memory makes subsequent file access less efficient.

Defragmentation refers to a process performed by the computer to reduce fragmentation by combining portions of files stored across non-contiguous areas of memory. Such combining of the file portions makes subsequent file access more efficient.

A conventional computer may run a defragmentation utility to defragment a file system while the computer is offline or during a non-busy time period (e.g., at 2:00 a.m.). Since computer performance degrades when running the defragmentation utility, running the defragmentation utility during such an inactive time gives the defragmentation utility an opportunity to complete defragmentation of the entire file system before the computer resumes higher activity.

SUMMARY

Unfortunately, there are deficiencies to the above-described conventional computer which runs the defragmentation utility to defragment the entire file system while the computer is offline or during a non-busy period. In particular, it is inconvenient to bring the computer offline (i.e., computer users lose computer access). Additionally, it may be desirable to run other computer utilities during the non-busy period (e.g., a backup or archiving utility, update utilities, etc.), and running the defragmentation utility during during those same times may interfere with the operation of those other computer utilities.

In contrast to the above-described conventional computer which simply runs a defragmentation utility to defragment an entire file system, improved techniques are directed to selective defragmentation based on input/output (IO) hot spots (i.e., active data extents in memory). Such techniques do not require defragmentation of an entire file system. Rather, such techniques enable the data in the most active areas of a memory space to be automatically identified for possible defragmentation. The data is then evaluated as a candidate for defragmentation and, if the data is selected for defragmentation, defragmentation is carried out for that data. Such evaluation of data in the most active areas of the memory space for selective defragmentation provides a smart methodology for prioritizing defragmentation effort. Furthermore, such selective defragmentation can have significantly less impact on system performance than a conventional defragmentation process that attempts to defragment an entire file system at once. In some situations, such selective defragmentation is even carried out transparently in the background in an ongoing manner (e.g., consuming free processor cycles).

One embodiment is directed to a method of managing data fragmentation which is performed in a data storage apparatus. The method includes receiving an indication that IO access to particular data stored within a memory space has exceeded a predefined threshold level. The method further includes performing, in response to the indication that IO access to the particular data stored within the memory space has exceeded the predefined threshold level, a defragmentation evaluation operation. The method further includes performing a set of data movement operations which moves the particular data from a first set of storage locations of the memory space (e.g., discontiguous data extents) to a second set of storage locations of the memory space to improve defragmentation of the particular data when a result of the defragmentation evaluation operation has a first value. The method further includes maintaining the particular data at the first set of storage locations of the memory space when the result of the defragmentation evaluation operation has a second value which is different than the first value.

Accordingly, the data storage apparatus is able to selectively defragment just portions of the file system at a time (e.g., hot spots within the file system) without comprehensively attempting to defragment all or most of the file system at one time. Such incremental operation nevertheless improves future IO access performance, and is capable of being carried out in the background by consuming free processor cycles thus minimizing system degradation.

In some arrangements, receiving the indication that IO access to the particular data stored within the memory space has exceeded the predefined threshold level includes processing a historical log of locks imposed on the memory space to ascertain the number of times the particular data stored within the memory space was accessed during a recent time period (e.g., within the last hour, within the last day, etc.). Such a historical log of locks maybe provided by a lock history module which records locks imposed on ranges of extents (e.g., read locks, write locks, etc.) during routine operation of the data storage apparatus.

In some arrangements, the memory space includes multiple tiers of non-volatile storage which are tiered based on IO access time (e.g., a first tier of flash memory, a second tier of Serial attached Small Computer System Interface or SAS memory, and a third tier of near line SAS memory, etc.). In these arrangements, since the data may be deemed "hot" due to high IO access activity, defragmentation involves transferring the data to a faster storage tier, or alternatively at least maintaining the data within the current tier (e.g., if the data already resides in the fastest storage tier) rather than moving the data to a slower tier.

In certain arrangements, the memory space is partitioned into logical unit (LUN) slices (e.g., 1 GB LUN sections). In some arrangements, defragmentation involves (i) allocating a LUN slice from a pool of empty LUN slices (if available) and (ii) storing the data in contiguous storage locations of the allocated LUN slice. In other arrangements, defragmentation involves (i) identifying a partially filled LUN slice (where a portion of the LUN slice has been previously filled with other data) and (ii) storing the data in contiguous storage locations of an empty portion of that partially filled LUN slice.

Other embodiments are directed to electronic systems and apparatus, processing circuits, computer program products, and so on. Some embodiments are directed to various processes, electronic components and circuitry which are involved in managing data fragmentation.

It should be understood that such selective defragmentation does not preclude performance of a separate full defragmentation effort. In some arrangements, the data storage apparatus exclusively performs selective defragmentation (e.g., in situations that may not benefit from a full defragmentation effort). In other arrangements, the data storage apparatus performs selective defragmentation at certain times (e.g., in an ongoing manner in the background, at certain times of the day, during detected very low periods of activity, etc.) and separate full defragmentation of the entire file system at other times (e.g., once a week, once a month, etc.). When full defragmentation is performed in a data storage system that has also performed selective defragmentation, the full defragmentation effort may consume less resources (e.g., time and processor cycles) vis-à-vis a conventional computer that exclusively performs full defragmentation since the overall amount of fragmentation within the file system is reduced by selective defragmentation.

It should be further understood that there are a variety of different implementations for the hardware of the data storage apparatus (e.g., a set of storage processors, a data storage array, cloud storage, etc.). In the context of a cloud environment, the data storage apparatus may be formed by remote computing and/or storage resources distributed over a network, and such an environment is capable of providing certain advantages such as enhanced fault tolerance, load balancing, processing flexibility, etc.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 8 is a block diagram of a portion of a lock history database which is managed by the data storage apparatus of FIG. 2.

DETAILED DESCRIPTION

Overview

An improved technique provides selective defragmentation based on identified input/output (IO) hot spots (i.e., active data extents in memory). Such a technique does not require defragmentation of an entire file system. Rather, such a technique enables data in the most active areas of a memory space to be automatically identified for possible defragmentation. This data is then evaluated as a candidate for defragmentation and, if the data is selected for defragmentation, defragmentation is carried out for that data. Such evaluation of data in the most active areas of the memory space for selective defragmentation provides a smart methodology for prioritizing defragmentation effort. Additionally, such selective defragmentation has significantly less impact on system performance than a conventional defragmentation process that attempts to defragment an entire file system at once. In some arrangements, such selective defragmentation is carried out transparently in the background (e.g., consuming otherwise unused processor cycles).

Figure 1:
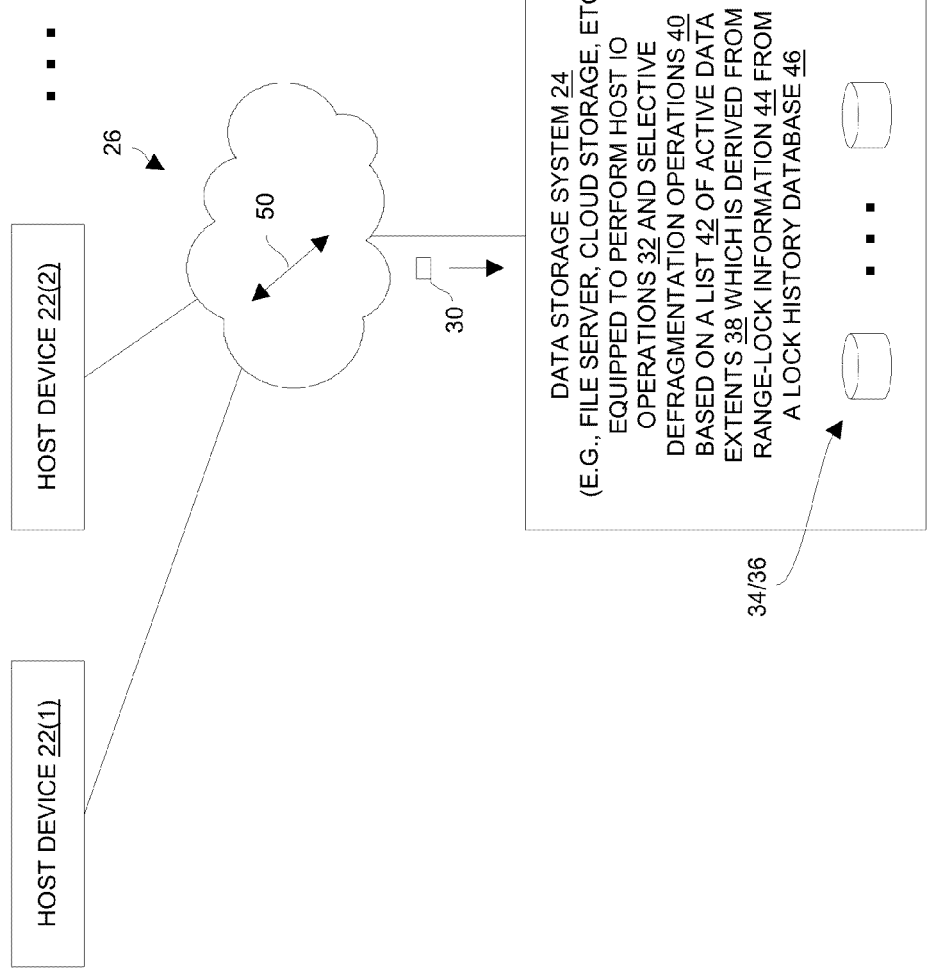
FIG. 1 is a block diagram of an electronic environment which includes a data storage apparatus equipped to perform selective defragmentation based on a history of active data extents.

FIG. 1 shows a data storage environment 20 which is equipped for selective defragmentation based on IO hot spots. The data storage environment 20 includes host devices 22(1), 22(2), ... (collectively, host devices 22), a data storage system 24, and a communications medium 26.

The host devices 22 are constructed and arranged to store host data into and load host data from the data storage system 24. Along these lines, each host device 22 provides host IOs 30 (e.g., read commands to read host data, write commands to write host data, etc.) to the data storage system 24 for processing.

The data storage system 24 is constructed and arranged to process the host IOs 30 from the host devices 22 by performing host IO operations 32 (e.g., read IOs, write IOs, etc.) on a set of LUNs 34. Each LUN 34 is partitioned into 1 GB slices 36, and each 1 GB slice 36 is partitioned into multiple extents (e.g., 8 KB blocks) for holding data, i.e., data extents 38. Such extents provide an addressable memory space (e.g., via logical block addressing or LBAs) and are mappable (e.g., to file system block numbers or FSBNs).

Additionally, the data storage system 24 is constructed and arranged to perform selective defragmentation operations 40 based on a list 42 of active data extents 38 (i.e., data which has been accessed frequently within a recent time period). Such selective defragmentation operations 40 include, among others things, polling for data extent activity information, ranking data extents 38 based on the activity information (e.g., hot or cold temperature), performing defragmentation evaluation operations on the data extents 38 and, if a decision is made to defragment the data extents 38, moving the data extents 38 together within the memory space to improve subsequent IO access performance. As will be explained in further detail below, the data storage system 24 is able to construct the active data extent list 42 from range-lock information 44 stored in a lock history database 46 and to perform the selective defragmentation operations 40 based on such range-lock information 44.

The communications medium 26 connects the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, or combinations thereof.

During operation, the data storage system 24 receives host IOs 30 from the host devices 22. In order to maintain data consistency, the data storage system 24 imposes locks on the data extents 38 when processing the host IOs 30. For example, the data storage system 24 applies read (or shared) locks on ranges of data extents 38 when the host devices 22 read host data from these ranges of data extents 38. Furthermore, the data storage system 24 applies write (or exclusive) locks on ranges of data extents 38 when the host devices 22 write host data to these ranges of data extents 38.

As the data storage system 24 imposes range locks on the ranges of data extents 38, the data storage system 24 updates the range-lock information 44 in the lock history database 46 based on these range locks. From the lock history database 46, the data storage system 24 is then able to identify which data extents 38 in the memory space are more active than others, and evaluate whether to defragment the more active data extents 38 while ignoring, at least temporarily, the less active data extents 38. Accordingly, the data storage system 24 is able to smartly focus its defragmentation efforts on active data extents 38 within the memory space.

Moreover, in some arrangements, the memory space spans multiple tiers of storage which are tiered based on IO access time (e.g., a first tier of flash memory, a second tier of SAS memory, and a third tier of near line SAS memory, etc.). In these arrangements, when the data storage system 24 defragments a set of active data extents 38, the data storage system 24 relocates the active data extents 38 to a higher storage tier if possible (i.e., if a faster storage tier exists, if available space exists, etc.). In certain arrangements, the data storage system 24 evacuates less active data extents 38 to a lower storage tier (i.e., slower storage) in order to provide room for the defragmented active data extents 38. Further details will now be provided with reference to FIG. 2.

Figure 2:
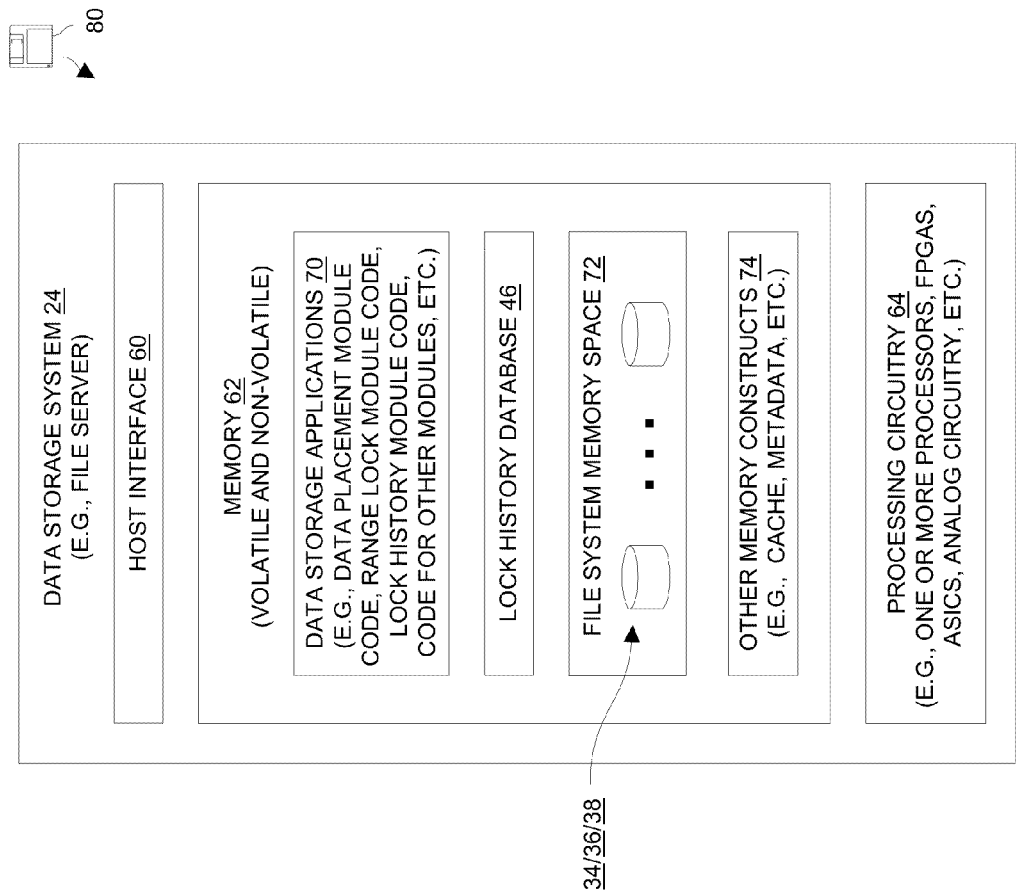
FIG. 2 is a block diagram of the data storage apparatus of FIG. 1.

FIG. 2 shows particular details of the data storage system 24 of the data storage environment 20 (also see FIG. 1). As shown in FIG. 2, the data storage system 24 includes a host interface 60, memory 62, and processing circuitry 64 among other things. The memory 62 includes a set of data storage applications 70, the lock history database 46, a file system memory space 72, and other memory constructs 74.

The host interface 60 is constructed and arranged to connect the data storage system 24 to the communications medium 26. Accordingly, the host interface 60 enables the data storage system 24 to communicate with the other components of the data storage environment 20 such as the host devices 22 (FIG. 1).

The memory 62 is intended to represent both volatile memory (e.g., DRAM, SRAM, etc.) and non-volatile memory (e.g., flash storage units, magnetic disk drives, etc.). The data storage applications 70 represent the operating system, drivers, utilities and tools, user-level applications, GUIs, and so on. The lock history database 46 contains the earlier-mentioned range-lock information 44. The file system memory space 72 represents persistent memory which contains the above-mentioned LUNs 34, slices 36 and data extents 38. The other memory constructs 74 include additional memory-based items such as a buffer cache to temporarily cache copies of host data accessed by the host devices 22, metadata for locks, metadata for the defragmentation operations 40 (e.g., the active data extent list 42, etc.), and so on.

In some arrangements, the memory space 72 is tiered into several levels based on access speed. For example, the memory space 72 may include a first tier of flash memory, a second tier of SAS memory, and a third tier of near line SAS memory. In these arrangements, the buffer cache of the data storage system 24 (also see the other memory 74 in FIG. 2) is constructed and arranged to temporarily cache, on behalf of the host devices 22, copies of the data extents 38 which are persistently stored (and synchronized) in the respective storage tiers of the memory space 72.

The processing circuitry 64 is constructed and arranged to perform load and store operations (i.e., to process host IOs 30) on behalf of the host devices 22 (FIG. 1). Additionally, the processing circuitry 64 is constructed and arranged to control updating of the lock history database 46, and perform selective defragmentation operations 40 based on information from the lock history database 46, among other things.

It should be understood that the processing circuitry 64 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 80 is capable of delivering all or portions of the software to the data storage system 24. The computer program product 80 has a non-transitory (or non-volatile) computer readable medium which stores a set of instructions which controls one or more operations of the data storage system 24. Examples of suitable computer readable storage media include tangible articles of manufacture and apparatus which store instructions in a non-volatile manner such as CD-ROM, flash memory, disk memory, tape memory, and the like.

During operation, the data storage system 24 performs host IO operations 32 in response to the host IOs 30 received from the host devices 22 (FIG. 1). As the data storage system 24 imposes locks on ranges of data extents 38 prior to accessing the ranges of data extents 38, the data storage system 24 updates range-lock information 44 in the lock history database 46 to reflect the ranges of data extents 38 which are locked by the host IO operations 32.

With the range-lock information 44 of the lock history database 46 now available for analysis, the contents of the lock history database 46 are able to identify whether data extents 38 within the memory space 72 are active and inactive. As a result, the data storage system 24 is able to effectively identify active data extents 38, and then evaluate the active data extents 38 for possible defragmentation. Further details will now be provided with reference to FIG. 3.

Figure 3:
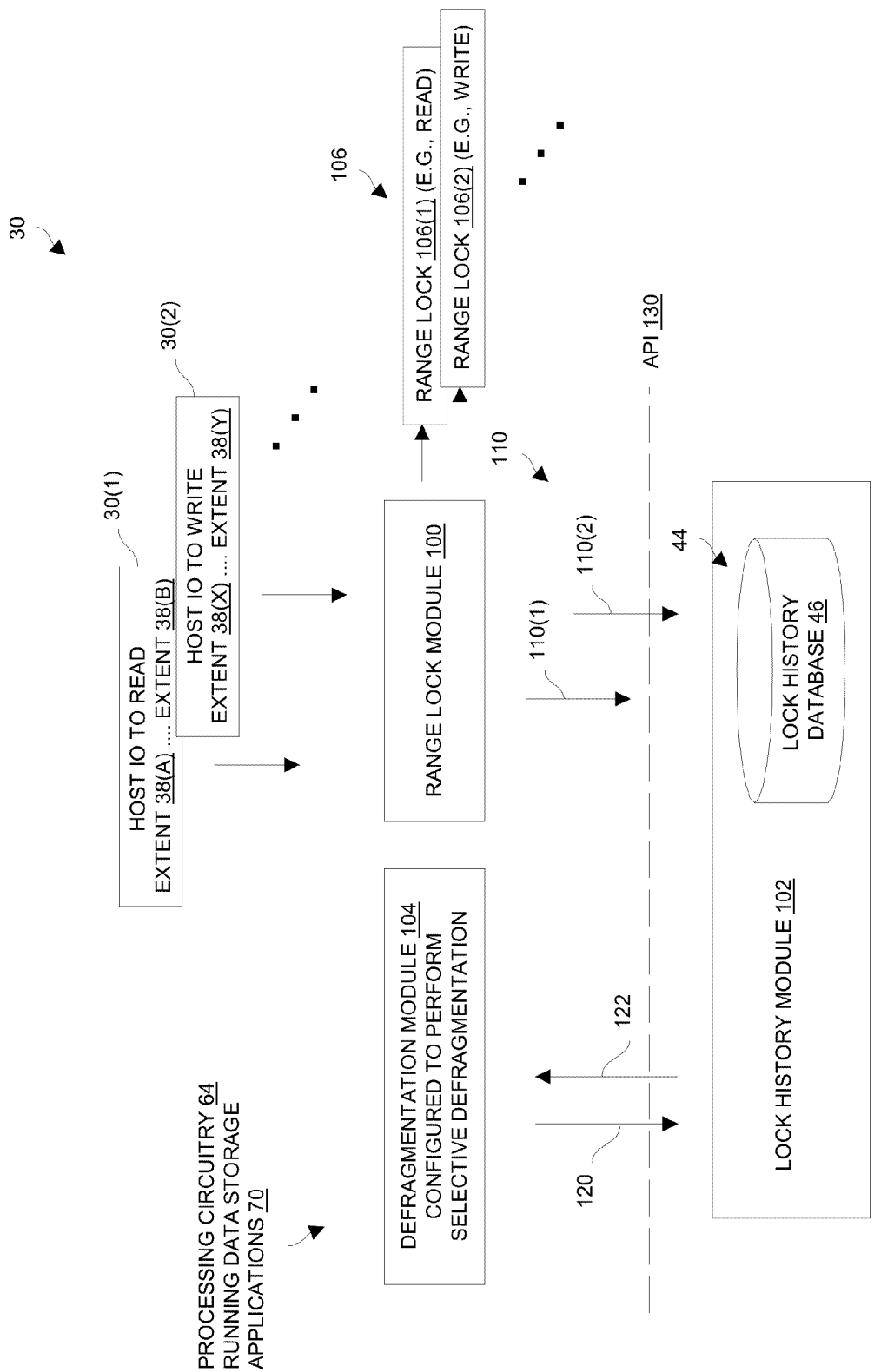
FIG. 3 is a block diagram of particular details of the data storage apparatus of FIG. 2.

FIG. 3 shows particular components of the data storage system 24 which are formed by the processing circuitry 64 when the processing circuitry 64 operates in accordance with the data storage applications 70 (also see FIG. 2). In particular, when the processing circuitry 64 executes code for a range lock module, the processing circuitry 64 forms a range lock module 100. Additionally, when the processing circuitry 64 executes code for a lock history module, the processing circuitry 64 forms a lock history module 102. Furthermore, when the processing circuitry 64 executes code for a defragmentation module, the processing circuitry 64 forms a defragmentation module 104. Likewise, the processing circuitry 64 is capable of executing other service module code (see applications 70 in FIG. 2) to form other service modules as well.

The range lock module 100 is constructed and arranged to impose range locks 106 on ranges of data extents 38 as the data storage system 24 performs the host IO operations 32, and thus preserve data coherency and consistency. By way of example, the range lock module 100 is shown as responding to a host IO 30(1) to read data extents 38(A), . . . , 38(B) by providing, as part of that host IO operation 32, a read lock 106(1) (i.e., a shared lock) on data extents 38(A), . . . , 38(B). Additionally, the range lock module 100 is shown as responding to another host IO 30(2) to write data extents 38(X), . . . , 38(Y) by providing, as part of that host IO operation 32, a write lock 106(2) (i.e., an exclusive lock) on data extents 38(X), . . . , 38(Y).

The lock history module 102 is constructed and arranged to manage the lock history database 46 holding the range-lock information 44 (also see FIG. 1). In particular, the lock history module 102 receives IO event messages 110 from the range lock module 100 which informs the lock history module 102 of the range locks 106 imposed by the range lock module 100. For example, when the range lock module 100 imposes the read lock 106(1) on data extents 38(A), . . . , 38(B), the range lock module 100 provides an IO event message 110(1) informing the range lock module 100 that a read lock 106(1) was imposed on the range of data extents 38(A), . . . , 38(B), and the lock history module 102 responds by adding an appropriate entry into the lock history database 46. Likewise, when the range lock module 100 imposes the write lock 106(2) on data extents 38(X), . . . , 38(Y), the range lock module 100 provides an IO event message 110(2) informing the range lock module 100 that a write lock 106(2) was imposed on the range of data extents 38(X), . . . , 38(Y), and the lock history module 102 responds by adding another appropriate entry into the lock history database 46.

As further shown by FIG. 3, the defragmentation module 104 is able to communicate with the lock history module 102. In particular, the defragmentation module 104 sends a request signal 120 to the lock history module 102 to obtain the contents of the lock history database 46. In response to the request signal 120, the lock history module 102 provides a response signal 122 containing the contents of the lock history database 46 thus enabling the defragmentation module 104 to process the contents and operate based on the contents.

Once the range-lock information 44 is obtained by the defragmentation module 104, the defragmentation module 104 creates a list 42 of active data extents 38, evaluates the active data extents 38 on the list 42 for possible defragmentation, and selectively defragments certain data extents 38 to improve subsequent IO performance. Further details will now be provided with reference to FIGS. 4 through 7.

Defragmentation Module

Figure 4:
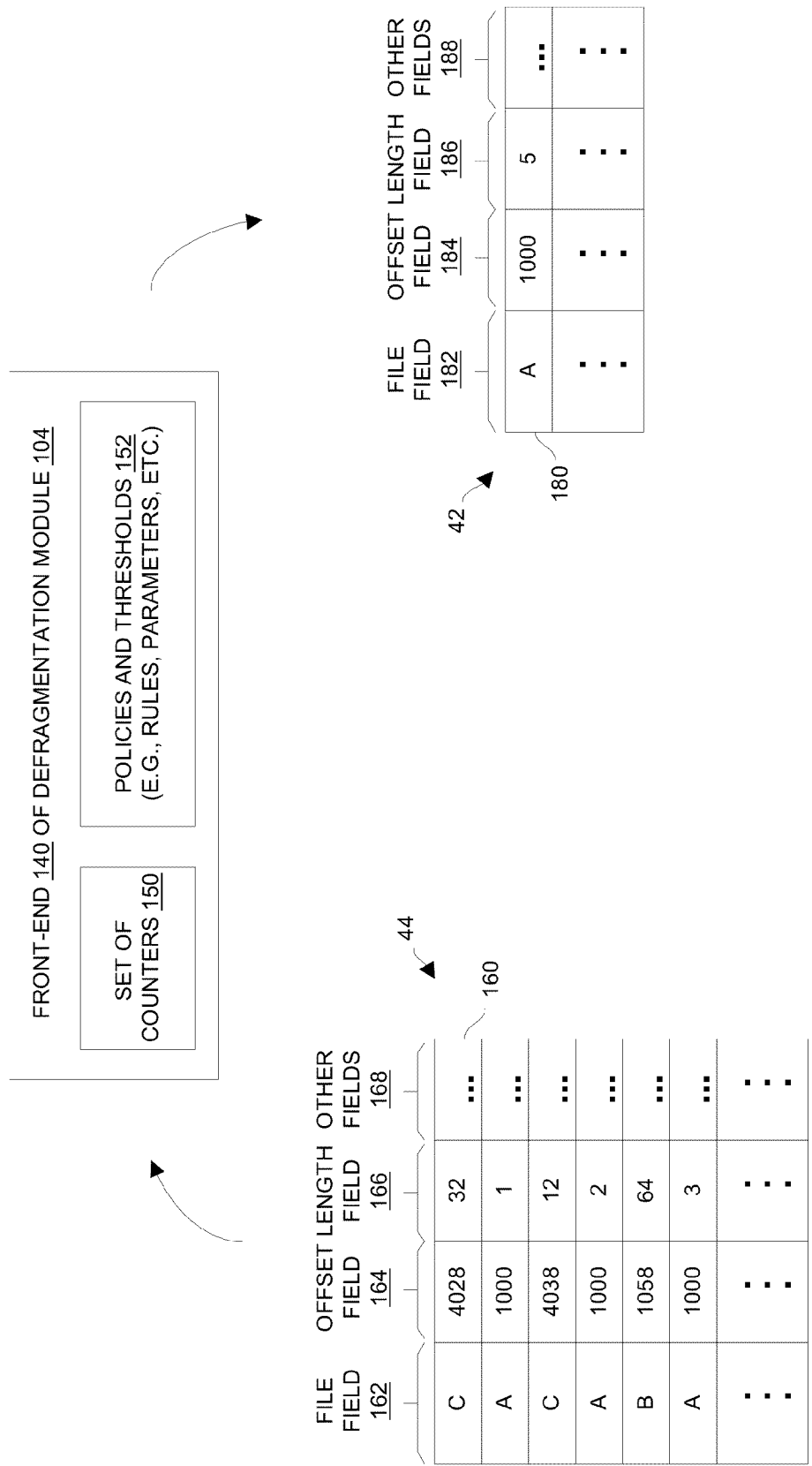
FIG. 4 is a block diagram of particular details of a front-end portion of a defragmentation module of the data storage apparatus of FIG. 2.

FIG. 4 shows certain operations of a front-end portion 140 of the defragmentation module 104. In particular, the front-end portion 140 obtains the range-lock information 44 from the lock history module 102 (also see FIG. 3), and constructs the list 42 of active data extents 38 based on the range-lock information 44. To this end, the front-end portion 140 utilizes a set of counters 150 as well as policies and thresholds 152. The set of counters 150 enables the front-end portion 140 to measure IO activity of ranges of data extents 28. The policies and thresholds 152 (e.g., rules, operating parameters, predefined threshold levels, etc.) define criteria as to whether the ranges of data extents 28 are active or inactive.

As shown in FIG. 4, the range-lock information 44 includes a set of range-lock entries 160. Each range-lock entry 160 includes a file field 162 to hold a file identifier (e.g., the identifier of a work or production file for a file system, etc.), an offset field 164 to hold an offset value identify a starting data extent 38 of a locked range, a length field 166 to hold a length value to identify the length of the locked range, and other fields 168 to hold additional information (e.g., the lock type, timestamp information, etc.). The range of locked data extents 38 is defined by the offset value and the length value. Of course, other ways for defining the range of locked data extents 38 are suitable for use as well (e.g., starting and end offset values, etc.).

As further shown in FIG. 4, the list 42 of active data extents 38 includes a set of list entries 180. Each list entry 180 includes a file field 182 to hold a file identifier (e.g., the identifier of a work or production file for a file system, etc.), an offset field 184 to hold an offset value to identify a starting data extent 38 of a range deemed to be active, a length field 186 to hold a length value identifying the length of the active range, and other fields 188 to hold additional information (e.g., the lock type, timestamp information, etc.). Again, the range of data extents 38 is defined by the offset value and the length value, but could be defined other ways (e.g., via starting and end offset values, etc.).

For the front-end portion 140 of the defragmentation module 104 to add an entry 180 to the list 42, the range of data extents 38 the information 44 must indicate that the range of data extents 38 has been accessed more than a predetermined threshold level within a recent period of time (e.g., within the last hour, within the last day, since the information 44 was last obtained from the lock history module 102, etc.). In some arrangements, the range of data extents 38 must have been accessed at least once within that time period (i.e., the threshold level is zero). In other arrangements, the range of data extents 38 must have been accessed more than once within that time period (i.e., the predetermined threshold level is one, two, three, etc.). Thus, the predetermined threshold level and the time period control the criteria used by the front-end portion 140 to distinguish between active and inactive.

It should be understood that the front-end portion 140 of the defragmentation module 104 may be set to run in the background (i.e., use free processor cycles) in an ongoing manner. In other arrangements, the front-end portion 140 is scheduled to wake up (i.e., transition to an awake mode from an inactive mode) periodically (e.g., once every 15 minutes, once every hour, etc.) or during preset time windows (e.g., after 7 P.M.). In yet other arrangements, the front-end portion 140 is scheduled to wake up when the level of host IO activity drops below a certain threshold and thus take advantage of opportune times of low traffic. Moreover, various combinations of these activation criteria as well as others (e.g., not while a backup utility is running, etc.) can be combined and tailored in order to run the front-end portion 140 during advantageous times of data storage system operation.

Figure 5:
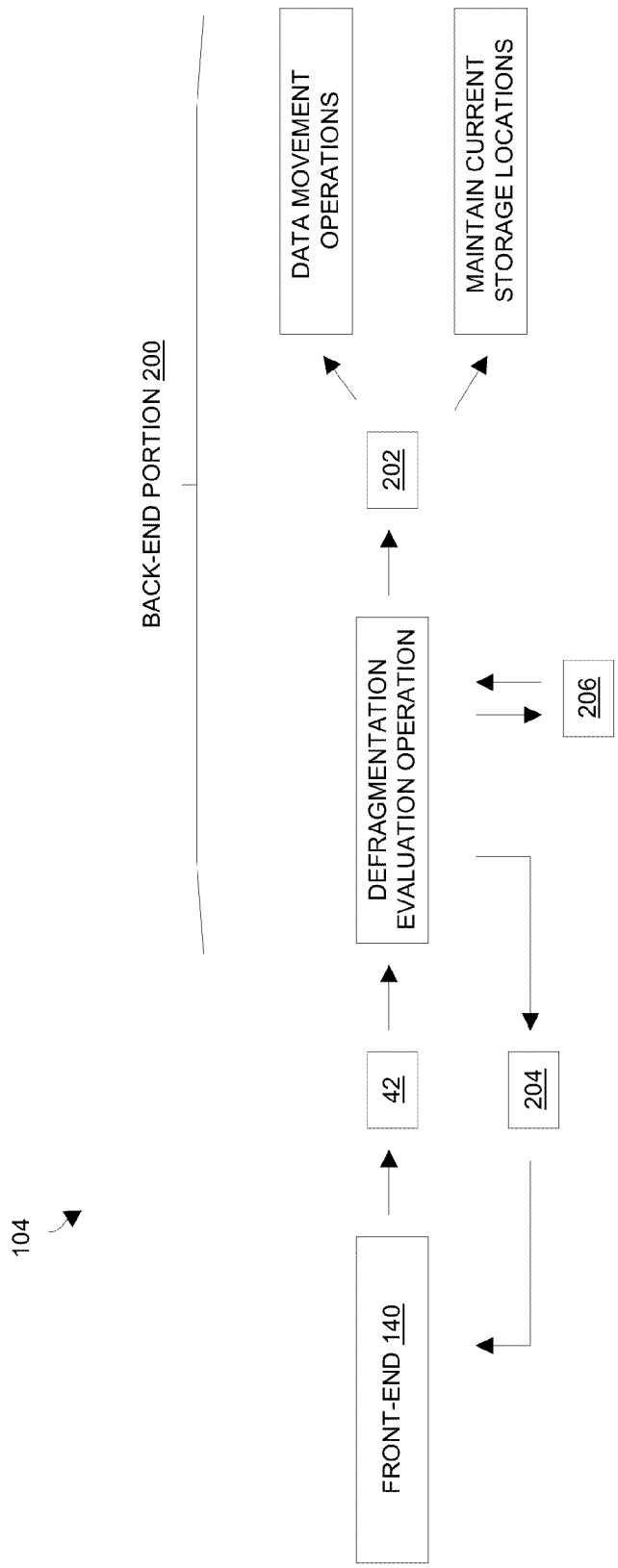
FIG. 5 is a block diagram of particular details of a back-end portion of the defragmentation module of the data storage apparatus of FIG. 2.

FIG. 5 shows certain operations of a back-end portion 200 of the defragmentation module 104. In particular, the back-end portion 200 receives the list 42 from the front-end 180 and performs an evaluation operation for possible defragmentation for each entry 180 on the list 42 (also see FIG. 4). Along these lines, the back-end portion 200 examines the range of active data extents 38 identified by each entry 180 of the list 42, and outputs a result 202 indicating whether the back-end portion 200 should perform defragmentation on the active data extents 38.

When the result 202 of the evaluation operation has a value indicating that defragmentation should be performed on particular data extents 38 identified by the list 42, the back-end portion 200 performs a set of data movement operations which moves the particular data extents 38 to new storage locations within the memory space 72 to improve defragmentation of the particular data extents 38. As mentioned earlier, in some arrangements, this transfer may result in placing the particular data extents 38 in a faster storage tier. Additionally, in some arrangements, the back-end portion 200 moves more than the particular data extents 38 identified by the list 42 (e.g., neighboring data extents 38, remaining portions of entire files, etc.) in an attempt to improve future IO access performance even further.

However, when the result 202 of the evaluation operation has a different value indicating that defragmentation should not be performed, the back-end portion 200 of the defragmentation module 104 simply maintains the active data extents 38 in their current storage locations within the memory space 72. That is, in some situations, it may be advantageous to leave the active data extents 38 in a defragmented formation (e.g., IO access may be better leaving active data extents 38 somewhat fragmented in a fast storage tier of flash memory vis-à-vis moving the active data extents 38 to a defragmented formation in a slower storage tier if that is the only alternative). It should be understood that a variety of standard factors may dictate to the back-end portion 200 whether defragmentation should be performed, and that these particular factors will not be discussed further.

If the back-end portion 200 of the defragmentation module 104 has defragmented a set of data extents 38 identified by an entry 180 on the list 42, the back-end portion 200 sends a notification 204 to the front-end portion 140 to clear the counter (or counters) 150 associated with the particular set of data extents 38 (also see FIG. 4). However, if the back-end portion 200 chose not to defragment the set of data extents 38, the back-end portion 200 does not send the notification 204 thus enabling the counter (or counters) 150 to remain updated with range-lock activity information 44.

Additionally, if the back-end portion 200 of the defragmentation module 104 has defragmented a set of data extents 38, the back-end portion 200 updates metadata 206 which enables the back-end portion 200 to track its defragmentation activity (also see the other memory constructs 74 in FIG. 2). In particular, the back-end portion 200 creates, as part of the metadata 206, a defrag timestamp record to indicate when the set of data extents 38 were last defragmented. Accordingly, the back-end portion 200 can use such metadata 206 in the future for improved control defragmentation frequency of the set of data extents 38 (e.g., to defragment a particular set of data extents 38 no more than once an hour or once a day, etc.).

Figure 6:
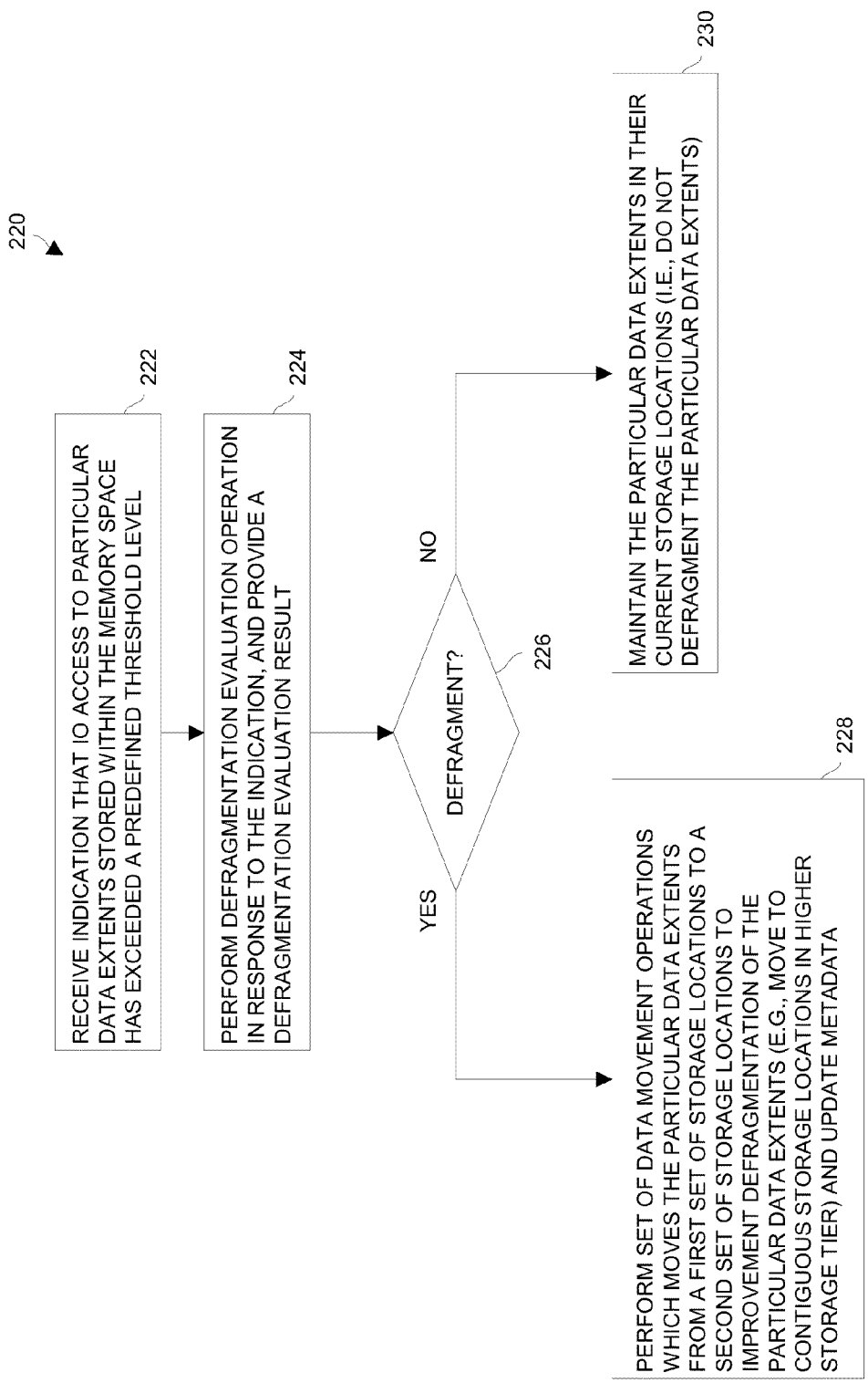
FIG. 6 is a flowchart of a selective defragmentation procedure performed by the data storage apparatus of FIG. 2.

FIG. 6 shows a flowchart 220 generally outlining the process performed by the back-end portion 200 of the defragmentation module 104 to management data defragmentation. In step 222, the back-end portion 200 receives an indication that IO access to particular data extents 38 stored within the memory space 72 has exceeded a predefined threshold level (also see the list 42 in FIGS. 4 and 5).

In step 224, the back-end portion 200 performs, in response to the indication that IO access to the particular data stored within the memory space has exceeded the predefined threshold level, a defragmentation evaluation operation. The defragmentation evaluation operation outputs a result 202 (FIG. 5).

In step 226, if the result 202 indicates that defragmentation of the particular data extents 38 should take place, step 226 proceeds to step 228. However, in step 226, if the result 202 indicates that defragmentation of the particular data extents 38 should not take place, step 226 proceeds to step 230.

In step 228, the back-end portion 200 performs a set of data movement operations which moves the particular data extents 38 from a first set of storage locations of the memory space 72 to a second set of storage locations of the memory space 72 to improve defragmentation of the particular data. Additionally, the back-end portion 200 updates its metadata (e.g., resets counters, records timestamps, etc.).

However, in step 230, the back-end portion 200 maintains the particular data extents 38 in the first set of storage locations of the memory space 72. Here, even if the data extents 38 were deemed to be active, the back-end portion 200 does not perform defragmentation based on the defragmentation evaluation result 202. Accordingly, selective defragmentation is achieved.

Figure 7:
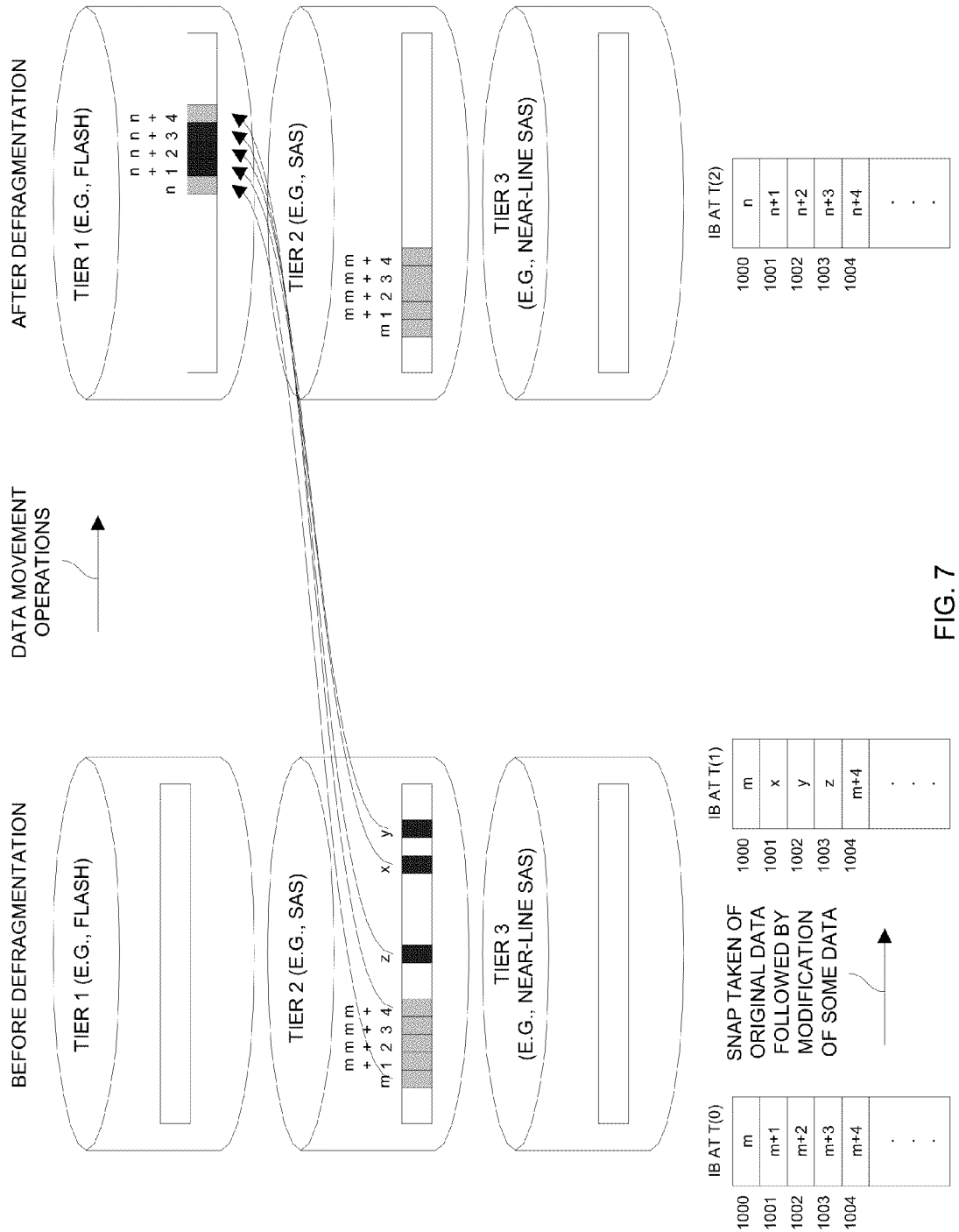
FIG. 7 is a block diagram illustrating aspects of an example defragmentation process.

FIG. 7 shows an example memory space 72 of the data storage system 24 before and after a defragmentation operation. The memory space 72 includes multiple tiers of storage, namely, a first tier of flash memory, a second tier of SAS memory, and a third tier of near line SAS memory. The first tier provides the fastest access times on average while the third tier provides the slowest access times on average.

In the example, suppose that, at an initial time T(0) and prior to defragmentation, original data to a file resides in five memory locations (m) through (m+4), i.e., addresses of the memory space 72. A portion of the inode pointer structure (IB) for the file is shown at the bottom left corner of FIG. 7. In particular, offset location 1000 contains address (m). Similarly, offset location 1001 contains address (m+1), and so on, thus enabling data storage system 24 to reference the data extents 38 of the file via the inode structure.

It should be understood that the data storage system 24 may access and manipulate the file over time. In this example, suppose that the data storage system 24 takes a snap of the data and then receives host IOs 30 (also see FIGS. 1 and 2) to update the original data in memory locations (m+1), (m+2), and (m+3) with new data. In response to these host IOs 30, the data storage system 24 maintains the original data in memory locations (m+1), (m+2), and (m+3) due to the existence of the snap. Accordingly, the data storage system 24 writes the new data respectively in new memory locations (x), (y), and (z), as well as logs the locking of the corresponding range of data extents 38 (e.g., offset=1001, length=3) which was required when performing the host IOs 30. As a further part of the IO process, the data storage system 24 updates the portion of the inode structure to reference the new memory locations for the new data, namely, memory locations (x), (y), and (z) (see the portion of the inode structure at time T(1) at the bottom of FIG. 7). Accordingly, the data storage system 24 is still able to reference the current data extents 38 of the file via the inode structure.

Next, suppose that the defragmentation module 104 (FIGS. 3 through 5) identifies the memory locations (x), (y), and (z) as being active, performs an evaluation of memory locations (x), (y), and (z), and decides to defragment not only the data extents 38 at these locations but neighboring data extents 38 as well. In this situation, the data storage system 24 performs a set of data movement operations which stores the contents of memory locations (m), (x), (y), (z), (m+4) of the second storage tier in memory locations (n), (n+1), (n+2), (n+3), (n+4) of the first storage tier. As a result, the current data for the file is now accessible in contiguous storage locations within a faster storage tier. Accordingly, subsequent access of the current data of the file is now optimized.

It should be understood that the data storage system 24 updates the portion of the inode structure for the file after defragmention so that it now references the storage locations of the first tier (i.e., see the portion of the inode structure at time T(2) in the bottom right corner of FIG. 7). It should be further understood that the original data is still stored in the original storage locations since, in this example, a snap currently exists. Further details of the lock history module 102 will now be provided.

Lock History Module

Figure 9:
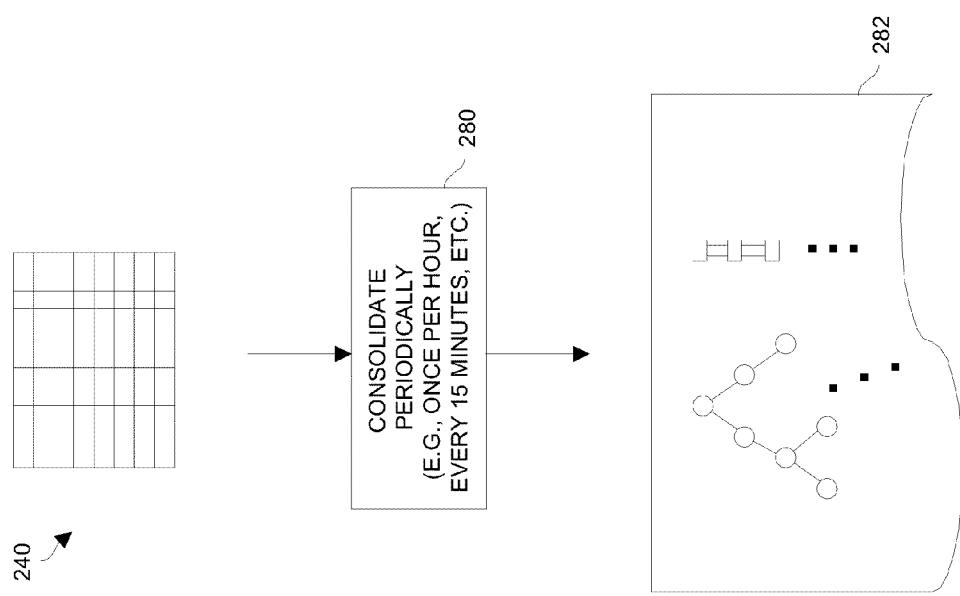
FIG. 9 is a block diagram of a consolidation process which is performed on the lock history database by the data storage apparatus of FIG. 2.
Figure 10:
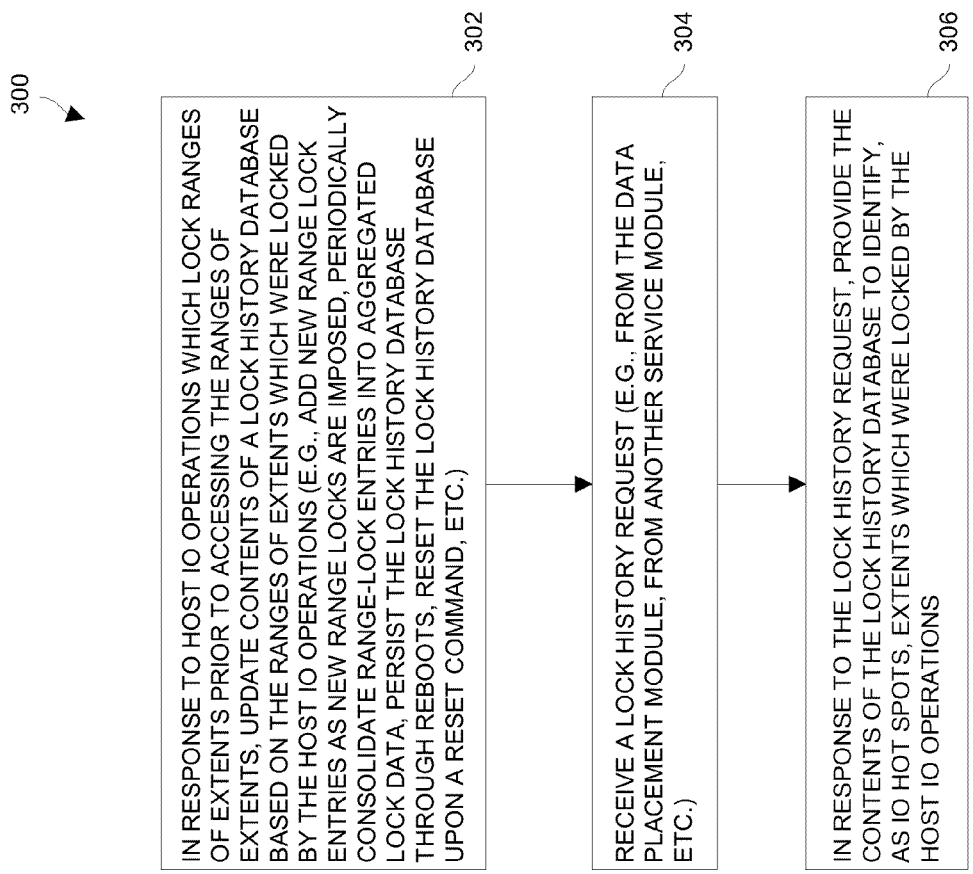
FIG. 10 is a flowchart of a procedure for managing access to the lock history database which is performed by the data storage apparatus of FIG. 2.

FIGS. 8 through 10 show particular details of the lock history module 102. In particular, FIG. 8 shows a set of range-lock entries 240 of the lock history database 46. FIG. 9 shows a consolidation operation which is periodically performed by the lock history module 102 on the set of range-lock entries 240 when managing the range-lock information of the lock history database 46. FIG. 10 shows a flowchart of a procedure 300 which is performed by the lock history module 102.

As shown in FIG. 8, the lock history database 46 includes a set of range-lock entries 240. Each time the lock history module 102 receives an event message 110 informing the lock history module 102 of a new lock 106 imposed on a range of extents 38 from the range lock module 100, the lock history module 102 adds a new range-lock entry 240 in the lock history database 46 to record that lock 106 (also see FIG. 3).

Each range-lock entry 240 includes a lock type field 250, a logical unit identifier (or file ID) field 252, a time stamp field 254, and a set of range fields 256. The fields of each range-lock entry 240 hold range-lock information corresponding to a range lock 106 imposed by the range lock module 100 during a particular host IO operation 32 thus recording the details of that range lock 106. In particular, the lock type field 250 holds a value indicating the type of lock (e.g., a read lock or a write lock) for that range lock 106. The logical unit identifier field 252 holds a logical unit identifier to identify a logical unit for that range lock 106 (i.e., a particular logical unit among multiple logical units maintained for reading and writing by the data storage system 24). The time stamp field 254 holds a time stamp indicating a particular time in which a particular host IO operation 32 locked the range of extents 38. The set of range fields 256 holds range data identifying the particular range of extents 38 which was locked by the particular host IO operation 32.

In some arrangements, the set of range fields 256 includes a starting offset field 258 and a range length field 260. The starting offset field of a range-lock entry 240 holds a starting offset of a particular range lock 106, and the range length field 260 holds the length of that particular range lock 106.

In other arrangements, the set of range fields 256 define range-locks differently. For example, in some arrangements, the set of range fields 256 simply includes a start offset field and an end offset field to hold the starting and ending offsets of a particular range lock 106.

FIG. 9 illustrates a process 280, which is performed by the lock history module 102 (FIG. 3), to consolidate the set of range-lock entries 240 of the lock history database 46 into aggregated lock data 282. Once the set of range-lock entries 240 is consolidated into the aggregated lock data 282, the set of range-lock entries 240 can be deleted from the lock history database 46 to reduce the amount of consumed memory 62. Such a process 280 is capable of being performed routinely (e.g., every hour, every 15 minutes, etc.) as well as manually (e.g., in response to a user command). As a result, the lock history database 46 includes a current set of range-lock entries 240 (i.e., range-lock entries 240 which have not yet been processed), aggregated lock data 282, or both if new range-lock entries 140 have been added since the consolidation process 280 was last performed.

Once a set of range-lock entries 240 has been processed to produce aggregated lock data 282, the aggregated lock data 282 indicates the extents 38 that had been identified by the set of range-locks 106. Accordingly, the aggregated lock data 282 identifies extents which have been recently accessed and which are thus considered active or "hot". Once the aggregated lock data 282 has been formed, future processing of a new set of range-lock entries 240 (i.e., range-lock entries 240 which have been added to the lock history database 46 since the last consolidation process 280) involves adjusting or updating the existing aggregated lock data 282 based on the new set of range-lock entries 240.

In some arrangements, when the lock history module 102 receives a request signal 120 for the contents of the lock history database 46 (FIG. 3), the lock history module 102 performs the consolidation process 280 on any existing range-lock entries 240 to update the aggregated lock data 282. The lock history module 102 then provides, as a response signal 122 (FIG. 3), only the aggregated lock data 282. For example, the response signal 122 may include a file or a pointer to a file containing just the aggregated lock data 282 or a copy of the aggregated lock data 282.

In some arrangements, the aggregated lock data 182 persists until it is cleared (e.g., in response to a user command to reset the values of the lock history database 46). In some arrangements, the lock history database 46 resides in non-volatile storage so that the lock history database 46 persists even during a reboot of the data storage system 24.

In some arrangements, the aggregated lock data 282 includes a mapping table which maps tallied access counts to each extent 38. In other arrangements, the aggregated lock data 282 includes nodes corresponding to time intervals (e.g., one hour ago, two hours ago, etc.) where each node identifies ranges of extents 38 which have been accessed within a particular time interval. Accordingly, the particular structure for the range-lock information in the aggregated lock data 282 may take a variety of forms, e.g., trees, linked lists, counters, combinations thereof, and so on.

One will appreciate that a variety of criteria may be used as a determining factor as to whether each extent 38 is active or inactive from the perspective of the lock history module 102. In some arrangements, if the lock history database 46 indicates that an extent 38 was accessed within a predefined amount of time (e.g., an hour, six hours, etc.), the extent 38 is considered active. In other arrangements, if the lock history database 46 indicates that an extent 38 was accessed at least a certain predefined amount of times within a particular amount of time (e.g., at least 3 times within the last 24 hours, etc.), the extent 38 is considered active. Similarly, an extent 38 may be considered inactive if the extent 38 fails to satisfy the active criteria. Further details will now be provided with reference to FIG. 10.

FIG. 10 shows a procedure 300 which is performed by the processing circuitry 64 of the data storage system 24, while operating as the lock history module 102, to identify IO hot spots (also see FIGS. 2 and 3). In step 302, the lock history module 102 updates the contents of the lock history database 46 based on the ranges of extents 38 which were locked by host IO operations 32. In particular, as the range lock module 102 locks ranges of extents 38 as part of the host IO operations 32, the range lock module 102 issues event messages 110 to the lock history module 102 informing the lock history module 102 of the range locks 106 (FIG. 3).

In step 304, the lock history module 102 receives a lock history request. For example, the defragmentation module 104 (or another service module) may provide a request signal 120 to the lock history module 102 requesting the contents of the lock history database 46.

In step 306, the lock history module 102 providing the contents of the lock history database 46 to identify, as the IO hot spots, extents 38 which were locked by the host IO operations 38. In particular, the lock history module 102 outputs a response signal 122 back to the requesting defragmentation module 104.

Further Details

As described above, improved techniques are directed to selective defragmentation based on input/output (IO) hot spots (i.e., active data extents 38 in memory). Such techniques do not require defragmentation of an entire file system. Rather, such techniques enable the data in the most active areas of a memory space 72 to be automatically identified for possible defragmentation. The data is then evaluated as a candidate for defragmentation and, if the data is selected for defragmentation, defragmentation is carried out for that data. Such evaluation of data in the most active areas of the memory space 72 for selective defragmentation provides a smart methodology for prioritizing defragmentation effort. Furthermore, such selective defragmentation can have significantly less impact on system performance than a conventional defragmentation process that attempts to defragment an entire file system at once. In some situations, such selective defragmentation is even carried out transparently in the background in an ongoing manner (e.g., consuming free processor cycles).

While various embodiments of the present disclosure have been particularly shown and described, it will be understood by those skilled in the art that various changes in form and details may be made therein without departing from the spirit and scope of the present disclosure as defined by the appended claims.

For example, it should be understood that, in an alternative arrangement, the front-end portion of the defragmentation module 104 outputs, as the list 42, an exhaustive listing of all ranges of extents that were accessed and marks each range with a temperature such as hot, warm, cold, etc. In other arrangements, the defragmentation module 104 relies on the lock history module 102 to provide the list 42 since, as described above, the lock history module 102 is capable of aggregating and processing data to identify active and inactive ranges of extents 38. Such modifications and enhancements are intended to belong to various embodiments of the disclosure.

What is claimed is:

1. In a data storage apparatus, a method of managing data fragmentation, the method comprising:
   receiving an indication that input/output (IO) access to particular data stored within a memory space has exceeded a predefined threshold level;
   in response to the indication that IO access to the particular data stored within the memory space has exceeded the predefined threshold level, performing a defragmentation evaluation operation;
   when a result of the defragmentation evaluation operation has a first value, performing a set of data movement operations which moves the particular data from a first set of storage locations of the memory space to a second set of storage locations of the memory space to improve defragmentation of the particular data; and
   when the result of the defragmentation evaluation operation has a second value which is different than the first value, maintaining the particular data at the first set of storage locations of the memory space;
   wherein receiving the indication that IO access to the particular data stored within the memory space has exceeded the predefined threshold level includes:
      processing a historical log of locks imposed on the memory space to ascertain the number of times the particular data stored within the memory space was accessed during a recent time period;
   wherein the historical log of locks imposed on the memory identifies ranges of extents which were locked during IO operations performed on the memory space; and
   wherein processing the historical log of locks imposed on the memory space includes updating a set of counters based on the ranges of extents which were locked during the IO operations and which are identified by the historical log of locks.

2. A method as in claim 1 wherein the memory space includes multiple tiers of non-volatile storage which are tiered based on IO access time; and
   wherein performing the set of data movement operations which moves the particular data from the first set of storage locations of the memory space to the second set of storage locations of the memory space includes transferring the particular data from an initial tier of non-volatile storage to a faster tier of non-volatile storage, the faster tier of non-volatile storage providing faster IO access time than the initial tier of non-volatile storage.

3. A method as in claim 1 wherein the memory space includes multiple tiers of non-volatile storage which are tiered based on IO access time; and
   wherein performing the set of data movement operations which moves the particular data from the first set of storage locations of the memory space to the second set of storage locations of the memory space includes transferring the particular data among storage locations of the same tier of non-volatile storage to prevent a decrease in IO access time.

4. A method as in claim 1 wherein the memory space is partitioned into logical unit (LUN) slices; and
   wherein performing the set of data movement operations which moves the particular data from the first set of storage locations of the memory space to the second set of storage locations of the memory space includes transferring the particular data to a contiguous sequence of storage locations of a single LUN slice.

5. A method as in claim 4 wherein the data storage apparatus maintains a pool of empty LUN slices; and
   wherein transferring the particular data to the contiguous sequence of storage locations of the single LUN slice includes (i) allocating a LUN slice from the pool of empty LUN slices and (ii) storing the particular data in that allocated LUN slice.

6. A method as in claim 4 wherein the data storage apparatus maintains partially filled LUN slices; and
   wherein transferring the particular data to the contiguous sequence of storage locations of the single LUN slice includes (i) identifying a particular LUN slice of the partially filled LUN slices and (ii) storing the particular data in an empty portion of that particular LUN slice.

7. A method as in claim 1 wherein a subset of the counters identifies a level of IO access to the particular data; and
   wherein the method further comprises:
      after performing the set of data movement operations, clearing the subset of the counters.

8. A method as in claim 1, further comprising:
   after performing the set of data movement operations, creating a defrag timestamp record to indicate when the particular data stored within the memory space was last defragmented.

9. A method as in claim 1 wherein updating the set of counters includes:
   updating the set of counters in response to shared locks imposed on ranges of blocks during host read operations.

10. A method as in claim 1 wherein updating the set of counters includes:
    updating the set of counters in response to exclusive locks imposed on ranges of blocks during host write operations.

11. A data storage apparatus which manages data fragmentation, the data storage apparatus comprising:
    a host interface;
    memory which provides a memory space; and processing circuitry coupled to the host interface and the memory, the processing circuitry being constructed and arranged to:
  receive an indication that input/output (IO) access to particular data stored within the memory space has exceeded a predefined threshold level,
  in response to the indication that IO access to the particular data stored within the memory space has exceeded the predefined threshold level, perform a defragmentation evaluation operation,
  when a result of the defragmentation evaluation operation has a first value, perform a set of data movement operations which moves the particular data from a first set of storage locations of the memory space to a second set of storage locations of the memory space to improve defragmentation of the particular data, and
  when the result of the defragmentation evaluation operation has a second value which is different than the first value, maintain the particular data at the first set of storage locations of the memory space;
wherein the processing circuitry, when receiving the indication that IO access to the particular data stored within the memory space has exceeded the predefined threshold level, is constructed and arranged to:
  process a historical log of locks imposed on the memory space to ascertain the number of times the particular data stored within the memory space was accessed during a recent time period;
wherein the historical log of locks imposed on the memory identifies ranges of extents which were locked during IO operations performed on the memory space; and
wherein the processing circuitry, when processing the historical log of locks imposed on the memory space, is constructed and arranged to update a set of counters based on the ranges of extents which were locked during the IO operations and which are identified by the historical log of locks.

12. A data storage apparatus as in claim 11 wherein the memory includes multiple tiers of non-volatile storage which are tiered based on IO access time; and
  wherein the processing circuitry, when performing the set of data movement operations which moves the particular data from the first set of storage locations of the memory space to the second set of storage locations of the memory space, is constructed and arranged to transfer the particular data from an initial tier of non-volatile storage to a faster tier of non-volatile storage, the faster tier of non-volatile storage providing faster IO access time than the initial tier of non-volatile storage.

13. A data storage apparatus as in claim 11 wherein the memory includes multiple tiers of non-volatile storage which are tiered based on IO access time; and
  wherein the processing circuitry, when performing the set of data movement operations which moves the particular data from the first set of storage locations of the memory space to the second set of storage locations of the memory space, is constructed and arranged to transfer the particular data among storage locations of the same tier of non-volatile storage to prevent a decrease in IO access time.

14. A data storage apparatus as in claim 11 wherein the memory space is partitioned into logical unit (LUN) slices; and
  wherein the processing circuitry, when performing the set of data movement operations which moves the particular data from the first set of storage locations of the memory space to the second set of storage locations of the memory space, is constructed and arranged to transfer the particular data to a contiguous sequence of storage locations of a single LUN slice.

15. A data storage apparatus as in claim 14 wherein the memory space includes a pool of empty LUN slices; and
  wherein the processing circuitry, when transferring the particular data to the contiguous sequence of storage locations of the single LUN slice, is constructed and arranged to (i) allocate a LUN slice from the pool of empty LUN slices and (ii) store the particular data in that allocated LUN slice.

16. A data storage apparatus as in claim 14 wherein the memory space includes partially filled LUN slices; and
  wherein the processing circuitry, when transferring the particular data to the contiguous sequence of storage locations of the single LUN slice, is constructed and arranged to (i) identify a particular LUN slice of the partially filled LUN slices and (ii) store the particular data in an empty portion of that particular LUN slice.

17. A data storage apparatus as in claim 11 wherein the processing circuitry, when updating the set of counters, is constructed and arranged to:
  update the set of counters in response to shared locks imposed on ranges of blocks during host read operations.

18. A data storage apparatus as in claim 11 wherein the processing circuitry, when updating the set of counters, is constructed and arranged to:
  update the set of counters in response to exclusive locks imposed on ranges of blocks during host write operations.

19. A computer program product having a non-transitory computer readable medium storing a set of instructions which, when carried out by computerized circuitry, directs the computerized circuitry to manage data fragmentation by performing a method comprising:
  receiving an indication that input/output (IO) access to particular data stored within a memory space has exceeded a predefined threshold level;
  in response to the indication that IO access to the particular data stored within the memory space has exceeded the predefined threshold level, performing a defragmentation evaluation operation;
  when a result of the defragmentation evaluation operation has a first value, performing a set of data movement operations which moves the particular data from a first set of storage locations of the memory space to a second set of storage locations of the memory space to improve defragmentation of the particular data; and
  when the result of the defragmentation evaluation operation has a second value which is different than the first value, maintaining the particular data at the first set of storage locations of the memory space;
wherein receiving the indication that IO access to the particular data stored within the memory space has exceeded the predefined threshold level includes:
  processing a historical log of locks imposed on the memory space to ascertain the number of times the particular data stored within the memory space was accessed during a recent time period; and
wherein processing the historical log of locks imposed on the memory space includes updating a set of counters based on the ranges of extents which were locked during the IO operations and which are identified by the historical log of locks.

20. A computer program product as in claim 19 wherein updating the set of counters includes:

updating the set of counters in response to shared locks imposed on ranges of blocks during host read operations.

21. A computer program product as in claim 19 wherein updating the set of counters includes:

updating the set of counters in response to exclusive locks imposed on ranges of blocks during host write operations.

\* \* \* \* \*